(12) United States Patent
Comp

(10) Patent No.: US 7,203,487 B2
(45) Date of Patent: Apr. 10, 2007

(54) PRE-NOTIFICATION OF POTENTIAL CONNECTION LOSS IN WIRELESS LOCAL AREA NETWORK

(75) Inventor: Lynn A. Comp, Round Rock, TX (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/128,770

(22) Filed: Apr. 22, 2002

(65) Prior Publication Data

US 2004/0203698 A1 Oct. 14, 2004

(51) Int. Cl.
*H04M 11/00* (2006.01)
(52) U.S. Cl. ............................... 455/422.1; 455/226.2
(58) Field of Classification Search ................ 455/421, 455/556.2, 436–440, 442, 226.2
See application file for complete search history.

(56) References Cited

U.S. PATENT DOCUMENTS

| | | | | |
|---|---|---|---|---|
| 4,639,914 A | * | 1/1987 | Winters | 370/334 |
| 5,134,708 A | * | 7/1992 | Marui et al. | 455/421 |
| 5,467,341 A | * | 11/1995 | Matsukane et al. | 370/253 |
| 5,722,068 A | * | 2/1998 | Bartle et al. | 455/421 |
| 5,799,244 A |   | 8/1998 | Matsumoto | 455/67.3 |
| 5,809,414 A | * | 9/1998 | Coverdale et al. | 455/421 |
| 5,864,578 A | * | 1/1999 | Yuen | 375/143 |
| 5,867,782 A | * | 2/1999 | Yoon | 455/421 |
| 5,923,735 A | * | 7/1999 | Swartz et al. | 379/93.12 |
| 5,987,062 A | * | 11/1999 | Engwer et al. | 375/225 |
| 5,991,901 A | * | 11/1999 | Mulford et al. | 714/704 |
| 6,188,890 B1 | * | 2/2001 | Chang | 455/421 |
| 6,219,540 B1 | * | 4/2001 | Besharat et al. | 455/421 |
| 6,243,581 B1 | * | 6/2001 | Jawanda | 455/432.2 |
| 6,330,438 B1 | * | 12/2001 | McClelland et al. | 455/421 |
| 6,381,463 B1 | * | 4/2002 | Tu et al. | 455/456.5 |
| 2001/0041566 A1 |   | 11/2001 | Xanthos et al. | 455/423 |
| 2001/0046855 A1 |   | 11/2001 | Kil | 455/421 |

FOREIGN PATENT DOCUMENTS

| | | |
|---|---|---|
| EP | 0310379 | 4/1989 |
| EP | 0693861 | 1/1996 |

* cited by examiner

*Primary Examiner*—Fan Tsang
*Assistant Examiner*—Simon Sing
(74) *Attorney, Agent, or Firm*—Schwegman, Lundberg, Woessner & Kluth, P.A.

(57) ABSTRACT

Notification is provided to a user within a wireless local area network when there is an elevated likelihood of losing a wireless network connection.

35 Claims, 4 Drawing Sheets

PRE-NOTIFICATION OF POTENTIAL CONNECTION LOSS IN WIRELESS LOCAL AREA NETWORK

BACKGROUND OF THE INVENTION

Wireless local area networks (WLANs) are becoming increasingly popular as a means to avoid the costs and inconveniences often associated with wired network connections. In a typical WLAN scenario, one or more wireless access points (APs) are connected to a wired local area network (LAN) to provide wireless access to the wired LAN for one or more user devices (although other WLAN arrangements also exist). Once a wireless link has been established between a user device and an AP, the user device will often be able to operate in substantially the same fashion as it would if it had a wired connection to the network. User devices that are coupled to a network through a wireless link enjoy a degree of portability that is not possible in a fully wired network. That is, to some extent, the user device may be carried about by the user (e.g., from the user's office to a nearby conference room, etc.) without losing the connection to the network. However, should the user device be moved too far from the corresponding AP, the network connection will be lost. If this occurs, any open applications on the user device that are using the network connection may crash, potentially resulting in a loss of data and/or other valuable information.

DETAILED DESCRIPTION

Figure 2:
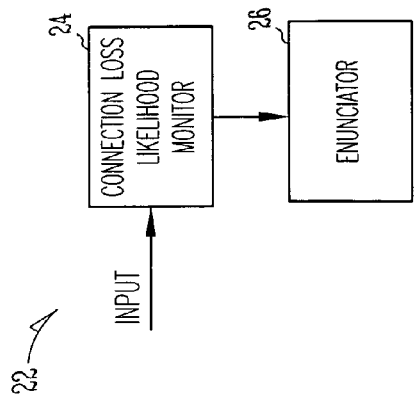
FIG. 2 is a block diagram illustrating user notification equipment for use in association with a wireless user device in accordance with an embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 1:
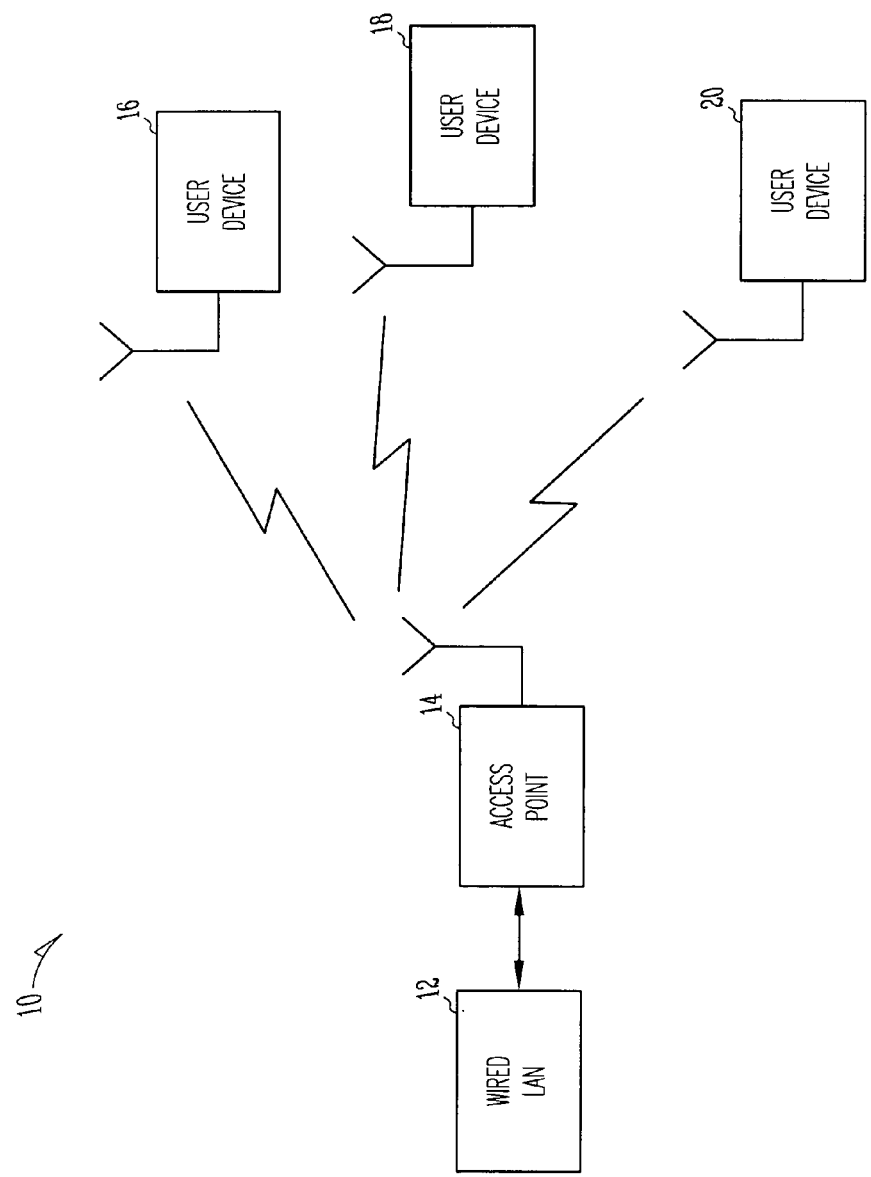
FIG. 1 is a block diagram illustrating a wireless local area network (WLAN) topology in accordance with an embodiment of the present invention.

FIG. 1 is a block diagram illustrating a wireless local area network (WLAN) topology 10 in accordance with an embodiment of the present invention. Other network topologies may alternatively be used. As illustrated, a wireless access point 14 provides access to a wired LAN 12 for one or more user devices 16, 18, 20. Although not shown, one or more additional access points may also be coupled to the wired LAN 12 to provide wireless access for additional user devices. The wired LAN 12 may include, for example, one or more servers for providing client/server functions within the network 10. The wired LAN 12 may also include functionality for providing a connection to another network (e.g., the Internet, a wide area network (WAN), etc.). The user devices 16, 18, 20 may include any of a wide variety of different digital data handling devices including, for example, laptop, palmtop, and/or desktop computers; personal digital assistants (PDA); pagers; and/or others. The number of user devices that can be supported by a single access point 14 may vary from system to system.

The user devices 16, 18, 20 each include wireless transceiver functionality that is capable of establishing and maintaining a wireless communication link with a corresponding access point 14. The wireless transceiver functionality will often comply with one or more wireless networking standards or technologies. Some common wireless networking standards/technologies include, for example: EEE 802.11a, b, g, HomeRF, HiperLAN, Ultrawideband, Bluetooth, wireless asynchronous transfer mode (WATM), digital enhanced cordless telecommunications (DECT), Wireless Universal Serial Bus (USB), Wireless IEEE 1394, and others. One or more of the user devices 16, 18, 20 may include a wireless network interface card (NIC) (e.g., an 802.11b NIC, etc.) that is installed within an appropriate input/output port of the device. Similarly, one or more of the user devices 16, 18, 20 may include wireless network components that are directly integrated within the device (i.e., without using an add-on card or board). An antenna or other radiating device or transducer will also typically be provided within a user device. In one implementation, radio frequency (RF) energy is used to provide wireless communication between each user device and a corresponding access point. It should be appreciated, however, that other forms of wireless signaling (e.g., infrared signaling, etc.) may alternatively be used.

The wireless access point 14 will typically have a limited range within which reliable communication with user devices can be supported. Thus, as a user device moves away from the access point 14 (e.g., as a user walks to a meeting with his/her laptop computer), a point may eventually be reached where the network connection is lost. In such an event, any applications that are currently running on the user device (or on a remote server) that are relying on the network connection (e.g., email programs, Internet browsers, etc.) may crash. Such crashes can result in a loss of valuable information and/or work product and may also require additional efforts to be made to return a corresponding user device to an operative and usable state (e.g., the Microsoft Windows® operating system may require a user to press control-alt-delete in an effort to close a program that is not responding). It was determined that many of the potential problems associated with the loss of a wireless network connection could be avoided if a corresponding user had notification of a potential connection loss before an actual loss has occurred. Such notification allows the user to take appropriate protective action when an increased likelihood of connection loss exists.

FIG. 2 is a block diagram illustrating user notification equipment 22 for use in association with a wireless user device in accordance with an embodiment of the present invention. As illustrated, the user notification equipment 22 includes a connection loss likelihood monitor 24 and an enunciator 26. The connection loss likelihood monitor 24 is operative for determining whether there is an elevated likelihood that a user device will lose a wireless network connection. When such a condition is sensed by the connection loss likelihood monitor 24, the enunciator 26 is used to notify a user associated with the user device so that the user can take appropriate action. The enunciator 26 may include any form of device that is capable of providing this notice to a user, including visual devices, audio devices, and/or audio/visual devices. Multiple enunciators 26 may also be used. In one approach, both the connection loss likelihood monitor 24 and the enunciator 26 are located with the corresponding user device. For example, the connection loss likelihood monitor 24 and the enunciator 26 may both be part of a network interface card installed within the user device. Alternatively, the connection loss likelihood monitor 24 and the enunciator 26 may both be directly integrated into the user device. In another alternative, one of the functions may be part of a NIC and the other directly integrated within the device. The enunciator 26 can also be externally coupled to the user device (e.g., as an external display and/or loudspeaker). Multiple enunciators 26 may also be provided that are each either part of a NIC, directly integrated, or externally connected to the user device. Other arrangements are also possible. In another approach, the connection loss likelihood monitor 24 is located at a remote location (e.g., within a network access point) and the enunciator 26 is located with the user device.

In at least one embodiment, the connection loss likelihood monitor 24 makes a connection loss determination based on input information relating to the wireless channel supporting the network connection. In one approach, for example, the connection loss likelihood monitor 24 receives information relating to one or more signal levels associated with the wireless channel (e.g., a receive signal level within the user device and/or an access point). If the signal level is below a threshold value, the monitor 24 may determine that there is an elevated likelihood of losing the network connection. In another approach, the connection loss likelihood monitor 24 receives information relating to the rate at which a signal level associated with the wireless channel is changing (or the monitor 24 may calculate this rate information based on the signal level information discussed above). If the signal level is decreasing at more than a predetermined rate, the connection loss likelihood monitor 24 may determine that there is an elevated likelihood of losing the network connection. In yet another possible approach, the connection loss likelihood monitor 24 receives error rate information associated with the wireless channel (e.g., a receive bit error rate of the user device or the access point). If the error rate is higher than a predetermined threshold, the connection loss likelihood monitor 24 may determine that there is an elevated likelihood of losing the network connection. Other techniques for making the connection loss determination, as well as combinations of techniques, may alternatively be used.

As described above, the enunciator 26 is used to notify a user of a potential loss of network connection before the loss of connection occurs so that the user may take appropriate action. Thus, the enunciator 26 may include any form of device that is capable of providing notice to a user, whether visual, audible, or both. For example, the enunciator 26 may include an indicator on an external surface of the user device, a user display associated with the user device, a speaker associated with the user device, etc. Combinations of such structures may also be used.

Figure 3:
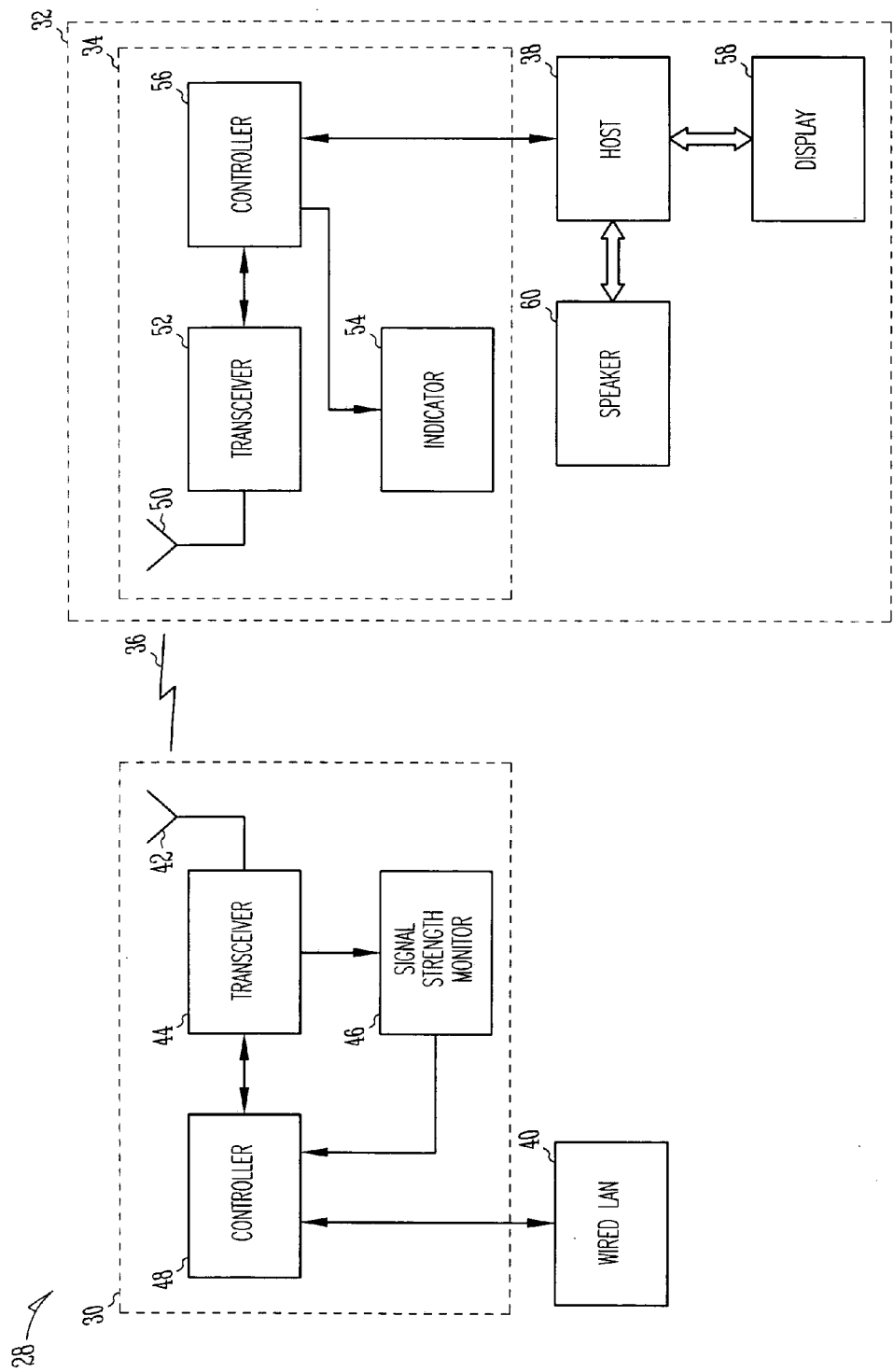
FIG. 3 is a block diagram illustrating a wireless LAN arrangement in accordance with an embodiment of the present invention.

FIG. 3 is a block diagram illustrating a wireless LAN arrangement 28 in accordance with an embodiment of the present invention. As illustrated, the wireless LAN arrangement 28 includes a wireless access point 30, at least one user device 32, and a wired LAN 40. The wireless access point 30 provides access to the wired LAN 40 (or another network structure) for the user device 32. The user device 32 communicates with the wireless access point 30 via a wireless communication channel 36. The wireless access point 30 includes: an antenna 42, a transceiver 44, a signal strength monitor 46, and a controller 48. The user device 32 includes: a wireless NIC 34, a host 38, a display 58, and a speaker 60. The wireless NIC 34 includes: an antenna 50, a transceiver 52, an indicator 54, and a controller 56. The wireless NIC 34 may be removably coupled to the host 38 at an input/output (I/O) port thereof (e.g., an expansion slot or PCMCIA slot). Alternatively, the functionality of the wireless NIC 34 may be made an integral part of the user device 32 (i.e., implemented within the device 32 and not as an add-on card or board). It should be appreciated that the individual blocks illustrated in FIG. 3 (and in other block diagrams herein) are functional in nature and do not necessarily represent discrete hardware elements. For example, in at least one embodiment, two or more of the functional blocks (or portions thereof) are implemented in software within a common digital processing device (e.g., a general purpose microprocessor, a digital signal processor (DSP), a reduced instruction set computer (RISC), a complex instruction set computer (CISC), a field programmable gate array (FPGA), an application specific integrated circuit (ASIC), or others). Individual functions may also be divided among multiple digital processing devices.

The transceiver 52 within the NIC 34 is operative for performing conventional RF receiver and transmitter functions for the user device 32. That is, during a transmit operation, the transceiver 52 will convert baseband information from the controller 56 into an RF transmit signal for delivery into the wireless channel 36 via antenna 50. During a receive operation, the transceiver 52 will process an RF signal received from the wireless channel 36 by antenna 50 to extract baseband information therefrom. Although illustrated as a single unit, the transceiver 52 maybe implemented as separate transmitter and receiver units. Appropriate duplexer functionality may also be provided to allow the transmit and receive functions to share a common antenna 50. In an alternative approach, separate transmit and receive antennas are provided within the wireless NIC 34. The transceiver 44 within the wireless access point 30 is similar in function to the transceiver 52 of the NIC 34 described above. In at least one implementation, the transceiver 44 includes multiple independent transmit/receive channels to support simultaneous wireless communication with multiple remote user devices. Multiple signal strength monitors 46 may also be provided within the access point 30 to simultaneously monitor receive signal strength for multiple remote user devices. In a system utilizing infrared (IR) signaling rather than RF, the antennas 42, 50 described above may be replaced by appropriate transducer structures.

The controller 56 within the NIC 34 provides, among other things, an interface between the transceiver 52 and the host 38. As will be described in greater detail, the controller 56 also acts as a connection loss likelihood monitor to provide notice to a user of the user device 32 when there is a potential loss of network connectivity (although a separate controller may alternatively be used to provide this functionality). The indicator 54 is mounted on an external portion of the wireless NIC 34 to provide a visible and controllable indication to the user of a present condition of the wireless channel 36. The controller 48 within the wireless access point 30 provides, among other things, an interface between the transceiver 44 and the wired LAN 40. The signal strength monitor 46 is operative for monitoring the strength of signals received by the access point 30 from the user device 32 through the wireless channel 36. The signal strength monitor 46 delivers the resulting signal strength information (or a portion thereof) to the controller 48 which may use the information to generate one or more signal strength messages for delivery to the user device 32 (e.g., via wireless channel 36). The controller 56 within the user device 32 may then use the corresponding signal strength information to determine whether the user of the device 32 should be notified of a potential loss of connection.

In one approach, the controller 48 within the access point 30 automatically delivers signal strength messages to the user device 32 (e.g., at regular intervals). In another approach, the controller 56 within the NIC 34 sends a signal strength request message to the access point 30 when signal strength information is desired and the controller 48 within the access point 30 sends a signal strength response message to the user device 32 in response thereto. The controller 56 may deliver signal strength request messages to the access point 30 at regular intervals in order to obtain continuously updated signal strength information. In one implementation, for example, the controller 56 causes a signal strength request message to be delivered to the access point 30 every 100–300 milliseconds.

After the controller 56 has obtained signal strength information from the access point 30, it may use the information to generate an appropriate indication on the (optional) indicator 54. A user associated with the user device 32 may then view the indicator 54 while a network connection is active to determine a current status and/or reliability of the connection. The user may then take appropriate action if the indicator 54 indicates that a loss of connection may be imminent. In one implementation, the indicator 54 includes three light emitting diodes (LEDs) having different colors (e.g., green, yellow, and red). If the signal strength information received from the access point 30 indicates that the signal strength is within a desirable range for supporting a wireless link (e.g., $\geq 70\%$ of nominal power), the controller 56 may cause a first of the LEDs within the indicator 54 to be illuminated (e.g., the green LED). If the signal strength information indicates that the signal strength is within a lower range (e.g., between 40% and 70% of nominal power), the controller 56 may cause a second of the LEDs to be illuminated (e.g., the yellow LED). If the signal strength information indicates that the signal strength is within an even lower range (e.g., $\leq 40\%$ of nominal power), the controller 56 may cause a third of the LEDs to be illuminated (e.g., the red LED). If the yellow LED is illuminated, the user has notification that the likelihood of losing the network connection is elevated and preventive action may be warranted. If the red LED is illuminated, the user has notification that the connection may have already been lost but, if it hasn't, immediate action should be taken to prevent loss of information. In another implementation, the indicator 54 includes a single LED that is illuminated whenever the signal strength is determined to be below a threshold value. In still another implementation, the indicator 54 includes a series of LEDs (e.g., 10 adjacent LEDs) that are set up as a signal level meter. That is, the number of LEDs that are illuminated at a particular time is proportional to the latest signal strength indication received by the controller 56. Electro-mechanical meters (e.g., d'Arsenval-type meter movements, etc.) may similarly be used. As will be appreciated, many other indicator types may alternatively be used in accordance with the present invention.

In addition to (or as an alternative to) the use of the indicator 54, the NIC 34 may use the display 58 associated with the host 38 to provide notification to the user of a potential loss of network connectivity. For example, in one approach, the controller 56 delivers an alert message to the display 58 when it is determined that an increased likelihood of connection loss exists (e.g., when the signal strength is found to be within a predetermined range). The controller 56 may make use of, for example, the application programming interface (API) of the operating system of the host 38 to generate the appropriate alert message. The alert message may be as simple as an on-screen warning that the present network connection is unreliable. The alert message may also include a suggestion for the user to save all work from and close all applications that are presently using the network connection. More complex alert messages may alternatively be provided. In one approach, for example, the controller 56 causes a list of possible response options to be displayed to the user on the display 58 (e.g., within a dialog box) when an increased likelihood of connection loss is detected. The list may include, for example, any one or more of the following response options: (1) to save all work from and close one or more presently open applications, (2) to save the application state of one or more presently open applications to cache, (3) to initiate a search for an alternate access point that is capable of supporting a network connection for the user device, (4) to change the position of the user device to a location that is closer to the corresponding access point, and (5) to close the alert box without taking any action. To ensure consideration of the list by the user, the list may be displayed in front of all other applications on the display 58 and may only be removed by an appropriate response from the user. As will be apparent to persons of ordinary skill in the art, other forms of alert message may alternatively be used.

If the signal strength information received from the access point 30 indicates that a weak signal is being received (e.g., $\leq 40\%$ of nominal power), the controller 56 may be programmed to automatically take preventive action. For example, the controller 56 may automatically store the application state of some or all of the relevant applications to cache. An appropriate message may also be displayed to the user on the display 58.

The controller 56 may also utilize the speaker 60 associated with the host 38 to notify the user of a potential network connection loss. For example, in one approach, the NIC 34 causes an audible tone to be emitted from the speaker 60 when the signal strength is determined to be within a predetermined range. Alternatively, a computer generated or digitized voice message may be emitted from the speaker 60. The voice message may state, for example, "You are at risk of losing your network connection. Please take appropriate action." In one embodiment, audible response options are presented to the user through the speaker 60. The user may then select an appropriate response option using an input device such as, for example, a keyboard, a touch screen, a mouse, a microphone (should speech recognition functionality be available), and/or others. The audible notification provided through the speaker 60 can be used in addition to, or as an alternative to, the visual notification provided by the display 58 and/or the indicator 54. An audible indication maybe valuable when, for example, the user is near the user device 32 but is not presently monitoring the display 58 or the indicator 54 (e.g., when the user is carrying the user device to a meeting, etc.).

As described above, in at least one embodiment of the invention, the controller 56 within the NIC 34 obtains signal strength information from the wireless access point 30 and uses the information to determine whether to notify a user of the user device 32 of a potential loss of network connection. In one alternative approach, the decision on whether to provide notification to the user is made within the wireless access point 30, rather than in the user device 32 (e.g., based on the output of the signal strength monitor 46). Then, if it is determined that notification is to be given, the wireless access point 30 transmits an instruction to the user device 32 to provide such notification. The controller 56 within the NIC 34 may then provide the notification to the user using one or more of the techniques described above.

Figure 4:
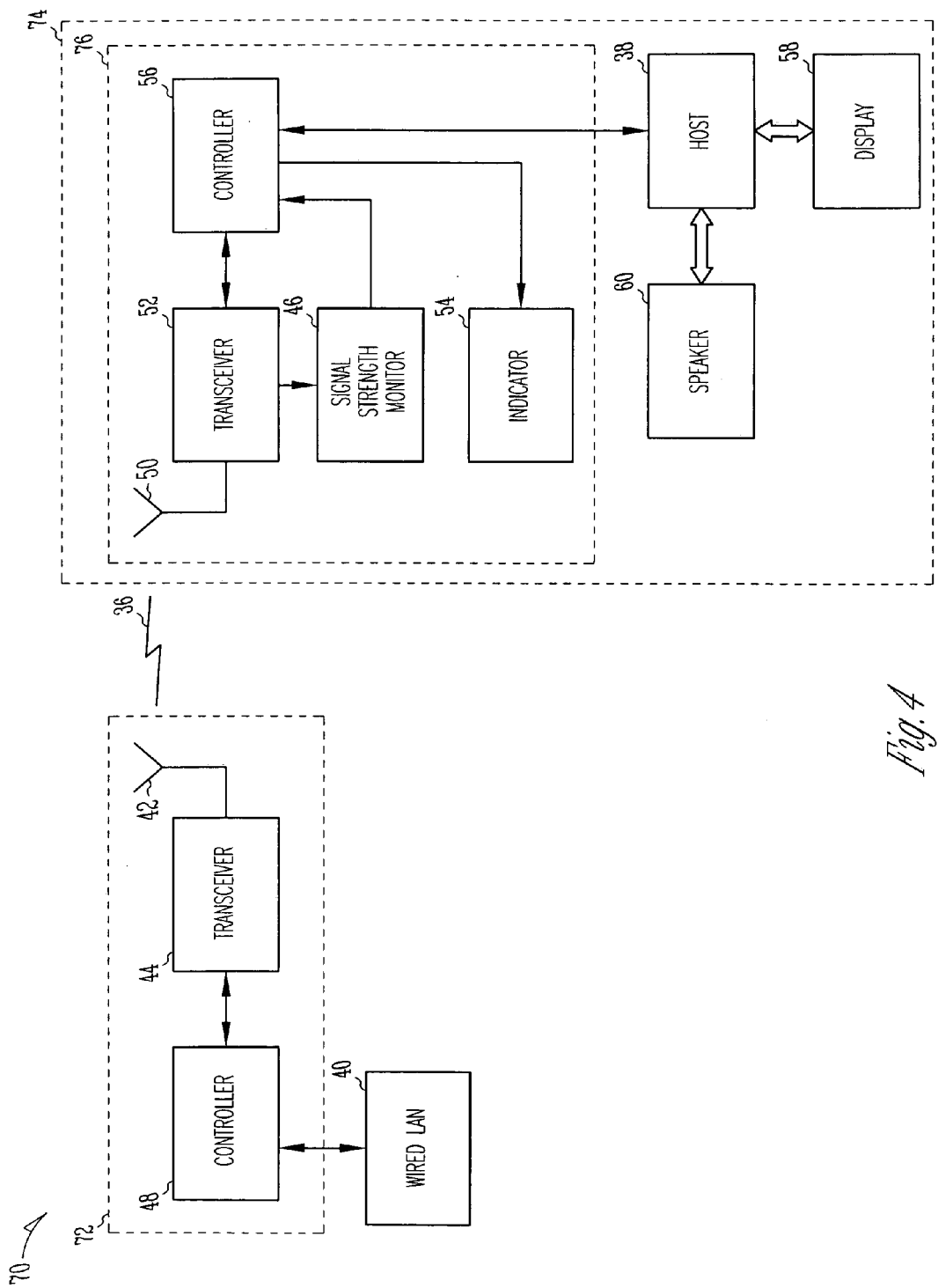
FIG. 4 is a block diagram illustrating a wireless LAN arrangement in accordance with another embodiment of the present invention.

FIG. 4 is a block diagram illustrating a wireless LAN arrangement 70 in accordance with another embodiment of the present invention. As before, a wireless access point 72 provides access to a wired LAN 40 (or similar network structure) for at least one user device 74. The user device 74 includes: a wireless NIC 76, a host 38, a display 58, and a speaker 60. The wireless LAN arrangement 70 of FIG. 4 is similar to the arrangement 28 of FIG. 3, except that the signal strength monitor 46 has been moved to the NIC 76 of the user device 74. The signal strength monitor 46 monitors the strength of signals received from the wireless access point 72 through the wireless channel 36. The signal strength monitor 46 delivers signal strength information to the controller 56 which uses the information to determine whether the user needs to be notified of a potential loss of network connection. The notification can be performed as previously described using the indicator 54, the display 58, and/or the speaker 60. In another possible arrangement, signal strength monitors 46 are provided within both a wireless access point and the corresponding user device. Notification may then be given to a user if the signal strength detected by either of the monitors indicates a potential loss of network connection.

In at least one embodiment, the above-described user notification techniques are implemented within a system that also uses transmit power control to support a wireless link between a network access point and a user device. Power control typically involves the adjustment of the transmit power of a device based on the signal level of a signal received from the device by another device. Thus, with reference to FIG. 1, the transmit power of the user device 16 may be reduced when a stronger than necessary signal is being received by the access point 14 (e.g., to conserve energy within the user device 16). Similarly, the transmit power of the user device 16 may be increased when the signal being received by the access point 14 is weak (e.g., to increase the quality of the wireless connection). Even when power control is being implemented, a loss of network connection is still possible. Thus, the user notification techniques described above can be advantageously used within such a system.

Figure 5:
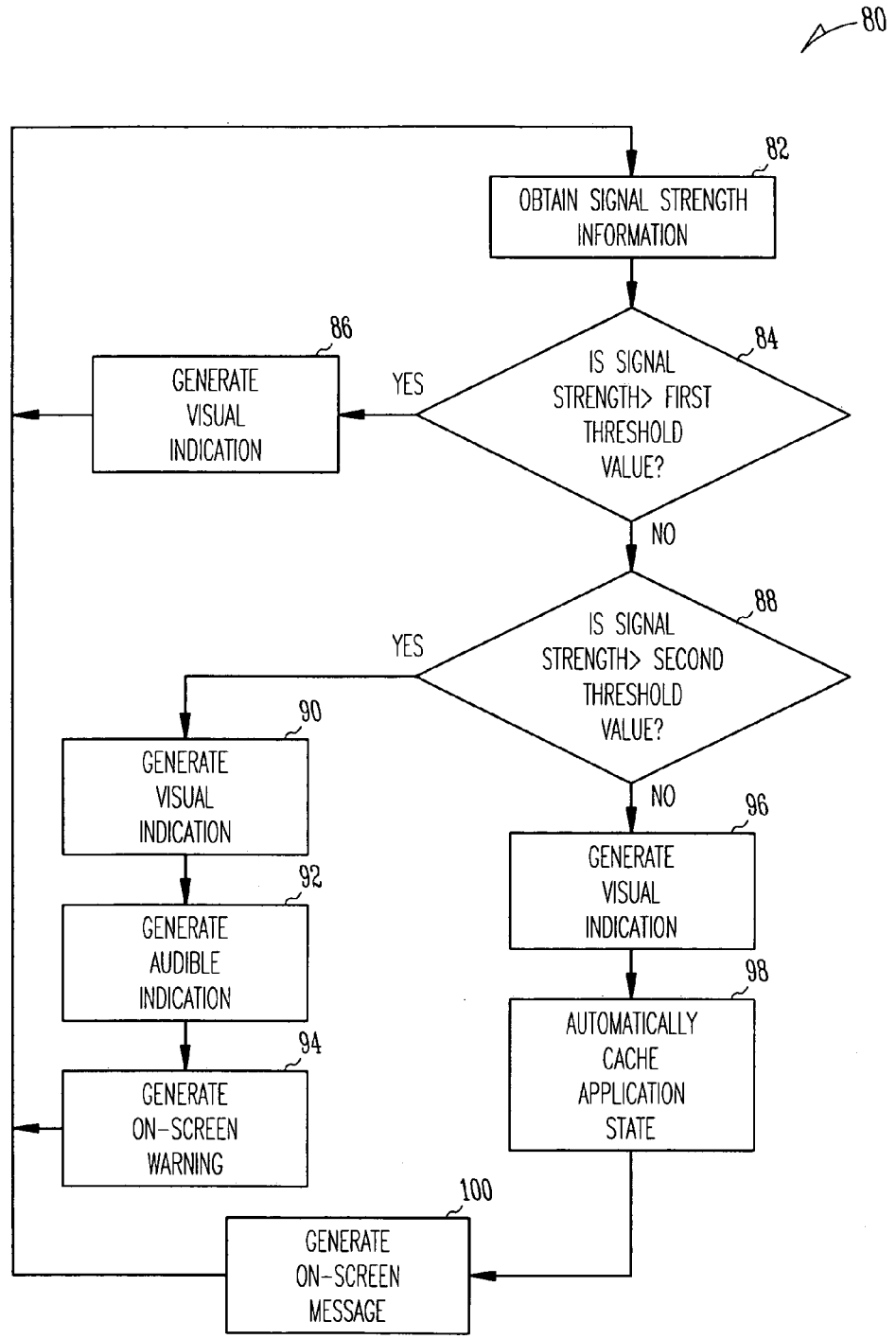
FIG. 5 is a flowchart illustrating a method for providing notification of a potential loss of a wireless network connection to a user in accordance with an embodiment of the present invention.

FIG. 5 is a flowchart illustrating a method 80 for providing notification of a potential loss of a wireless network connection to a user in accordance with an embodiment of the present invention. First, signal strength information is obtained that relates to a wireless communication link supporting the wireless network connection (block 82). It is next determined whether the signal strength indicated by the signal strength information is greater than a first threshold value (block 84). If the signal strength is greater than the first threshold value, a visual indication of such (e.g., the illumination of a green LED or similar indicator, etc.) may be provided to the user (block 86). The method 80 may then return to block 82. If the signal strength is not greater than the first threshold value, it is next determined whether the signal strength is greater than a second threshold value (block 88). The second threshold value is lower than the first threshold value. If the signal strength is greater than the second threshold value, but less than the first threshold value, a corresponding visual indication (e.g., the illumination of a yellow LED or similar indicator, etc.) may be provided to the user (block 90). An audible indication may also be provided to the user (block 92). In addition (or in the alternative), an on-screen warning of a potential connection loss may be provided to the user (block 94). Any one or more of these notification techniques may be used. The on-screen warning may include a list of possible response options that may be undertaken by the user. The method 80 may then return to block 82.

If the signal strength is not greater than the second threshold value, a corresponding visual indication (e.g., the illumination of a red LED or similar indicator, etc.) may be provided to the user (block 96). The application state of one or more applications being executed on the user device may then be automatically stored in cache (block 98). An on-screen message may also be generated on a display device to notify the user of the present status of the wireless network connection (block 100). The on-screen message may also inform the user that one or more application states have been stored in cache. An on-screen list of possible response strategies may also be provided at this point. The method 80 may then return to block 82.

In at least one embodiment of the invention, signal strength information is obtained, and the above-described method 80 is repeated, at regular intervals (e.g., every 100–300 milliseconds). The user may also be given the ability to modify the update interval based on his/her individual needs (e.g., if the user rarely moves the user device, the update interval can be increased or the notification feature can be deactivated). It should be appreciated that many modifications may be made to the method 80 of FIG. 5. For example, in one modification, only a single threshold value is used. If the signal strength is below the single threshold value, notification of potential connection loss may be provided to the user as described above (e.g., block 90, block 92, and/or block 94). One or more automatic response actions may also be performed (e.g., block 98). Other modifications to the method 80 are also possible.

Although the present invention has been described in conjunction with certain embodiments, it is to be understood that modifications and variations may be resorted to without departing from the spirit and scope of the invention as those skilled in the art readily understand. For example, the above-described user notification techniques may also be used to provide notification of a potential loss of connection between user devices in an ad-hoc type wireless network (i.e., a network where network connections are maintained through user to user wireless links). Such modifications and variations are considered to be within the purview and scope of the invention and the appended claims.

What is claimed is:

1. A wireless local area network comprising:
   a wireless access point coupled to a wired local area network;
   at least one user device having a wireless network connection to the wireless access point;
   a connection loss likelihood monitor to determine whether there is an elevated likelihood of the user device losing a wireless network connection when a signal strength associated with a wireless communication channel of between the wireless local area network and the wireless access point falls within a predetermined range; and
   an enunciator, co-located with the user device, to notify a user when the connection loss likelihood monitor determines that the signal strength falls within a first predetermined range, and a currently open application is automatically saved to a cache when the signal strength falls within a second predetermined range, said second predetermined range being lower than and non-overlapping with said first predetermined range.

2. The wireless local area network of claim 1, wherein:
   said connection loss likelihood monitor is located within a network access point.

3. The wireless local area network of claim 1, wherein:
   said connection loss likelihood monitor is co-located with the user device.

4. The wireless local area network of claim 1, wherein:
   said enunciator includes a light emitting diode.

5. The wireless local area network of claim 1, wherein:
   said enunciator includes a display.

6. The wireless local area network of claim 1, wherein:
   said enunciator includes a speaker.

7. A wireless network interface card for insertion into a user device, comprising:
   a connection loss likelihood monitor to determine when a signal strength associated with a communication channel between a user device and a local network falls within a first predetermined range indicating that there is an elevated likelihood of the user device losing a wireless connection to a local area network; and
   means for notifying a user of the user device when the signal strength is determined to fall within the first predetermined range, and
   means for automatically saving a currently open application to cache when the signal strength falls into a second predetermined range, said second predetermined range being lower than and non-overlapping with said first predetermined range.

8. The wireless network interface card of claim 7, wherein:
   said means for notifying includes means for controlling an indicator on the network interface card responsive to a determination of the connection loss likelihood monitor.

9. The wireless network interface card of claim 7, wherein:
   said means for notifying includes means for displaying an alert message to be displayed on a display of the user device.

10. The wireless network interface card of claim 7, wherein:
    said means for notifying includes an audible alert.

11. A method for use within a wireless local area network, comprising:
    determining when a signal strength associated with a communication channel between a user device and a local network falls within a first predetermined range indicating that whether there is an elevated likelihood that a user device in the wireless local area network will lose a wireless connection with a local area network over a wireless communication channel; and
    notifying a user of the user device when the signal strength is associated determined to be within a first predetermined range, and
    automatically saving a currently open application to cache when the signal strength falls into a second predetermined range, said second predetermined range being lower than and non-overlapping with said first predetermined range.

12. The method of claim 11, wherein:
    determining also includes determining whether the signal level is decreasing at a rate that is greater than a predetermined rate.

13. The method of claim 11, wherein:
    determining also includes determining whether an error rate associated with the wireless communication channel supporting the wireless connection is greater than a predetermined error rate.

14. A wireless network interface card for insertion into a user device, comprising:
    a controller to notify a user of the user device when a signal strength associated with a wireless communication channel between the wireless network interface card and a remote network access point of a local area network is determined to be within a first predetermined range; and
    said controller to automatically save an open application to cache when the signal strength a second predetermined range, said second predetermined range being lower than and non-overlapping with said first predetermined range.

15. The wireless network interface card of claim 14 comprising:
    a signal strength monitor to monitor a strength of signals received from the remote network access point via the wireless communication channel, said controller to obtain signal strength information from the signal strength monitor for use in determining whether to notify the user.

16. The wireless network interface card of claim 14, wherein:
    said controller obtains signal strength information from the remote network access point for use in determining whether to notify the user.

17. The wireless network interface card of claim 16, wherein:
    said controller generates a signal strength request message for transmission to the remote network access point to request said signal strength information.

18. The wireless network interface card of claim 14, wherein:
    said controller is to notify the user by causing an alert message to be displayed on a display associated with the user device.

19. The wireless network interface card of claim 18, wherein:
    said alert message presents a number of response options to the user for the user to select from.

20. The wireless network interface card of claim 19, wherein:
    said alert message includes a response option to save an application state associated with a currently open application to local cache.

21. The wireless network interface card of claim 19, wherein:
said alert message includes a response option to search for an alternate access point.

22. The wireless network interface card of claim 14, wherein:
said controller causes notification to be provided to the user by appropriately controlling a visual indicator on an external surface of the wireless network interface card.

23. The wireless network interface card of claim 14, wherein:
said controller causes notification to be provided to the user by causing an audible signal to be emitted from a speaker associated with the user device.

24. The wireless network interface card of claim 14, wherein:
said first predetermined range includes a range between a first predetermined signal strength and zero.

25. A wireless access point to provide wireless access to a local area network for a user device, comprising:
a receiver to receive signals from the user device and couple them to a local area network;
a signal strength monitor to monitor the strength of the signals received from the user device; and
a controller to generate a signal strength response signal for delivery to the user device when a signal strength request signal is received from the user device, said signal strength request signal requesting signal strength information for use in determining whether to notify a user associated with the user device of a potential loss of connection to the local area network, said controller to generate said signal strength response signal based on information output by the signal strength monitor, when the signal strength information indicates that a signal strength is determined to be within a first predetermined range, and said controller automatically saving a currently open application to cache when the signal strength information indicates that the signal strength is within a second predetermined range, said second predetermined range being lower than and non-overlapping with said first predetermined range.

26. The wireless access point of claim 25, comprising:
at least one additional receiver to receive wireless communication signals from at least one other user device.

27. The wireless access point of claim 26, comprising:
at least one additional signal strength monitor to monitor the strength of wireless communication signals received from said at least one other user device.

28. The wireless access point of claim 25, wherein:
said controller includes a power control function to generate a power control message for delivery to the user device instructing the user device to adjust its transmit power, said power control message being different from said signal strength response signal.

29. A method for notifying a user associated with a user device of a potential loss of a wireless network connection, comprising:
obtaining signal strength information relating to a wireless communication channel between the user device and a network access point in a local area network, said network access point providing access to the local area network for the user device; and
notifying the user when the signal strength information indicates a signal strength within a first predetermined range; and
automatically saving a currently open application to cache when the signal strength information indicates a signal strength within a second predetermined range, said second predetermined range being lower than and non-overlapping with said first predetermined range.

30. The method of claim 29, wherein:
obtaining signal strength information includes transmitting a signal strength request message to the network access point via the wireless communication channel and receiving a signal strength response message from the network access point in response thereto, said signal strength response message including said signal strength information.

31. The method of claim 29 wherein:
obtaining signal strength information includes acquiring an output signal of a signal strength monitor located with the user device.

32. The method of claim 29 wherein:
notifying the user includes appropriately controlling an external indicator associated with the user device.

33. The method of claim 29 wherein:
notifying the user includes causing an alert message to be displayed on a display associated with the user device.

34. The method of claim 33 wherein:
said alert message presents a number of response options to the user for the user to select from.

35. The method of claim 29 wherein:
notifying the user includes causing an audible signal to be emitted from the user device.

* * * * *